United States Patent Office 3,543,489
Patented Dec. 1, 1970

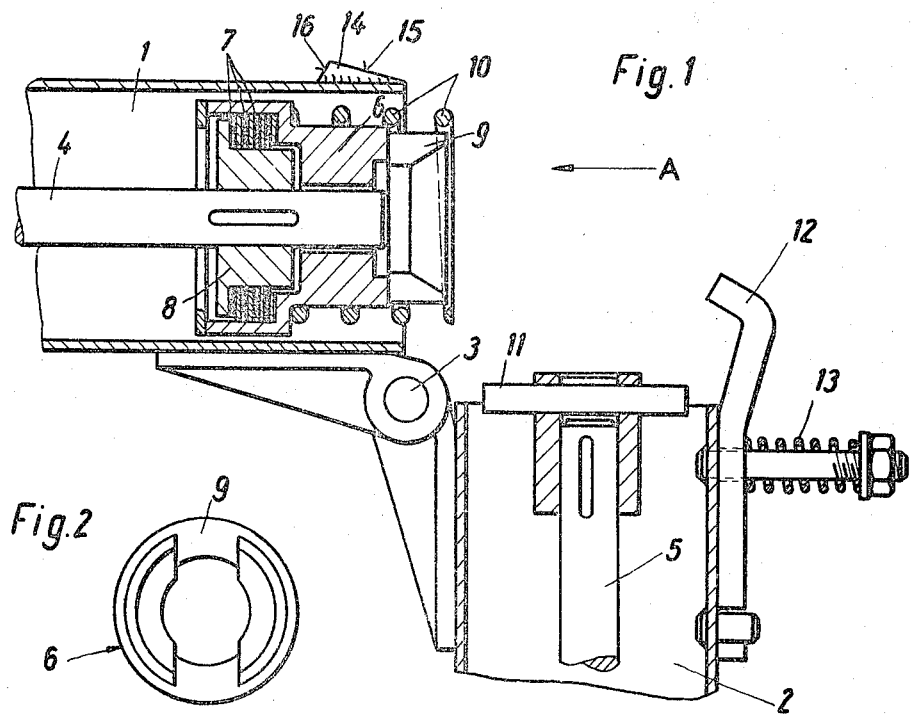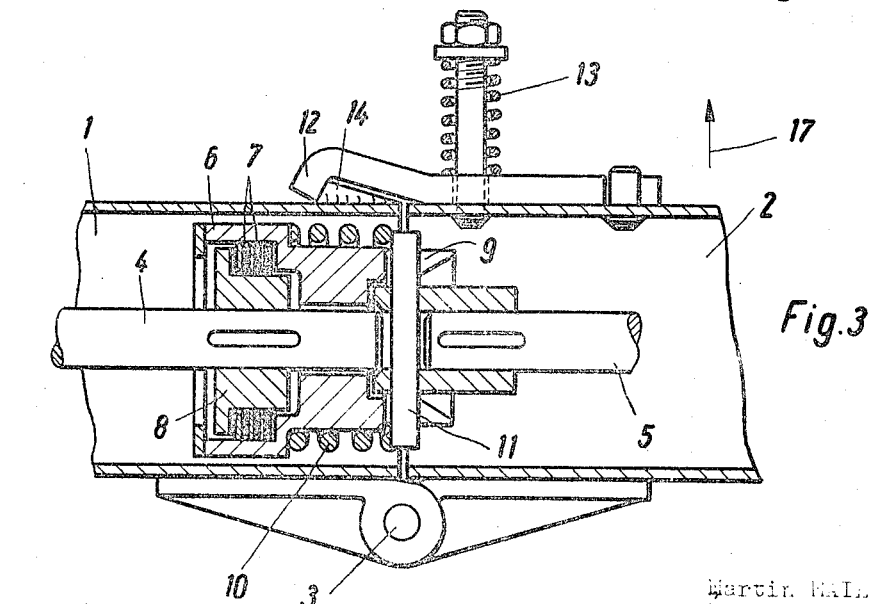

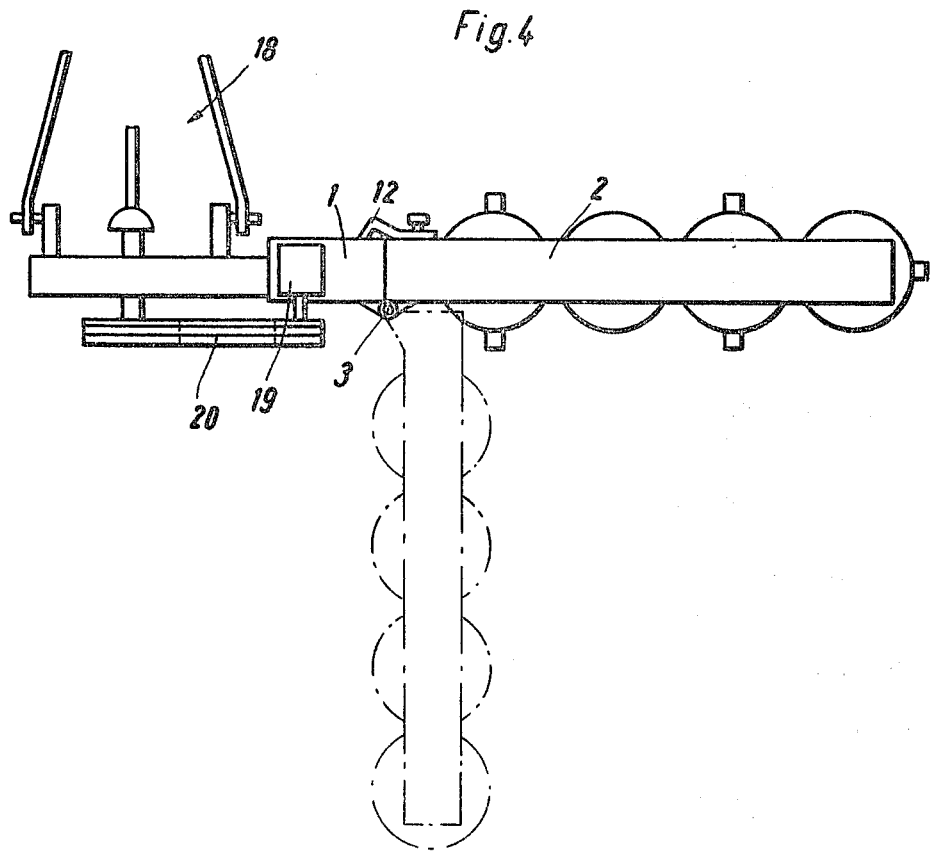

3,543,489
AGRICULTURAL IMPLEMENTS
Martin Maier, Martin Stelzle, and Ludwig Kasberger, Gottmadingen, Germany, assignors to Firma Maschinenfabrik Fahr Aktiengesellschaft, Gottmadingen, Germany, a corporation of Germany
Filed Oct. 15, 1968, Ser. No. 767,623
Claims priority, application Austria, Oct. 20, 1967, A 9,464/67
Int. Cl. A01d 35/26
U.S. Cl. 56—25.4   7 Claims

ABSTRACT OF THE DISCLOSURE

An agricultural implement having a beam carrying rotating tools and projecting to one side of a tractor. A shaft extending along the beam is arranged to be driven by a dog clutch and a friction clutch which is arranged to transmit power only when the dog clutch is engaged. The beam is furthermore provided with an overload catch so that it may swing back into a trailing position if the beam should strike an obstacle.

---

The present invention relates to agricultural implements and more particularly to such implements which comprise a beam which extends to the side of the line of travel and carries rotating tools, such as scythe rotors, and means for coupling a shaft extending along the beam when the beam is hinged from a folded into an extended position.

Known implements of this type have the disadvantage that coupling and uncoupling of the shaft of the beam is only possible when the drive supplied by a tractor or other driving means is disconnected.

One object of the present invention is to improve this coupling in such a manner that operation of the coupling can be carried out without interrupting the drive.

The present invention consists of an agricultural field implement comprising a beam which carries tool means and can be swung about a hinge between a folded position and a position extending over the ground perpendicular to the direction of travel, two shafts which are substantially coaxial in the extended position of the beam and of which one extends along the beam for driving tool means on the beam, the shafts being connected by a dog clutch at a position adjacent to the hinge, one half of the dog clutch being fixed on one shaft while the other is journalled on the other and is connected with the shaft by a friction clutch which is arranged to be brought into the torque-transmitting condition by an axial thrust on it brought about when the dog clutch halves are brought into engagement.

In the implement in accordance with the invention both dog clutch halves are preferably stationary during the time in which they are being brought into engagement. It is only when they are substantially fully in engagement that the friction clutch is brought into its torque-transmitting condition so that the dog clutch is caused to rotate the shaft running along the beam. The coupling operation is therefore not only simpler but also simpler and more reliable. For uncoupling the sequence of operations is reversed, that is to say the friction clutch is declutched and then the dog clutch.

In accordance with the preferred embodiment of the invention, the implement comprises a spring for exerting pressure on the friction clutch, the spring being arranged to be moved axially by the fixed dog clutch half. The implement can comprise a compression spring mounted coaxially on the journalled dog clutch half so that one end of the spring abuts against a shoulder of this dog clutch half while the other end is arranged to engage the other dog clutch half and, in the folded condition of the beam, to overlap a recess in the journalled dog clutch half.

In accordance with a further feature of the invention, the fixed dog clutch half comprises a diametrical pin arranged to fit into a recess in the journalled dog clutch half.

Again in accordance with a preferred feature of the invention, the hinge permits folding of the beam in a backward direction in relation to the line of travel of the propelling means and the implement further comprises an overload catch holding the beam in the extended position.

The implement can comprise, as the catch, a spring-loaded dog and a projection with a ramp face arranged to be engaged by the dog. Means can be provided for adjustment of the spring-loading on the dog and thus of the force required to push the beam out of the extending position. One embodiment of the invention, a rotary scythe mower, is now described with reference to accompanying drawings.

FIG. 1 is a plan view of parts of the implement in the uncoupled condition.

FIG. 2 is a view looking in the direction of arrow A of FIG. 1.

FIG. 3 is a plan view, corresponding to FIG. 1, showing the coupled condition.

FIG. 4 is a plan view of the scythe mower as a whole, the extended condition being shown in full lines and the folded condition in broken lines.

As shown in the figures, a beam-like carrier 1 and a beam 2 are connected together by means of a hinge 3. The carrier 1 and the beam 2 are in the form of a tube. Inside them the shafts 4 and 5 are journalled. At the end of the drive shaft 4 there is a dog clutch half 6 which is journalled on the shaft and can move axially in relation to it a small amount. One end of the dog clutch half 6 is connected with a rotary part 8 by means of a multi-plate friction clutch 7 with plates. The rotary part 8 is keyed on the shaft 4. The other end of the dog clutch half 6 has a diametrically placed recess 9.

Around the dog clutch half 6 there is a coaxial compression spring 10 whose left-hand end abuts against a shoulder on the clutch half 6. The other end of the spring 10 ends substantially in the same plane as the right-hand end of the dog clutch half 6. The shaft 5 journalled in the beam 2 comprises a round pin 11 perpendicular to the axis of the shaft and having a diameter somewhat less than the breadth of the recess 9. Its length corresponds approximately to the diameter of the compression spring 10. A dog clutch 12, which can be moved through a limited range, is mounted on the side of the beam 2 opposite the hinge 3. The dog 12 can be moved against the action of a spring 13. On the carrier 1 at a position opposite the hinge there is a projection 14 for cooperation with the catch dog 12. The projection 14 has a ramp face 15 and a steep retaining or holding face 16.

The shaft 5 extends along the beam 2 to the right for driving scythe rotors about vertical axes. The rotors are provided with suitable bearing means in the beam 2. The carrier 1 is supported on the back of a tractor by means of a three-point linkage denoted by general reference numeral 18. The shaft 4 is driven by means of a belt 20 and pulleys from the power take off shaft at the rear of the tractor. Reference numeral 19 indicates transmission gearing for connecting the shaft 4 with the belt drive.

In the extended position of the beam 2, as shown in FIGS. 3 and 4, the round pin 11 attached to the shaft 5 fits in the recess or groove 9 and pushes on the spring 10 so as to cause engagement of the frictional faces of the clutch 7. As a result, a torque-transmitting connection is established between the two shafts 4 and 5. The clutch 7 also functions as an overload clutch. The beam 2 is aligned with the carrier 1 and is held in the extended position by the dog 12 which is pressed against the steep holding face 16 by the spring 13. This is the working position of the beam 2.

If during the course of mowing the beam 2 strikes an obstruction during movement along the line of travel 17, the catch constituted by the dog 12 and the projection 14 is opened owing to the force generated by the cooperation of the catch with the steep face 16 being greater than the holding force produced by the spring 13. As a result the beam 2 swings back in a horizontal plane about the axis of the hinge 3 into the position shown in broken lines in FIG. 3. Right at the beginning of the swinging movement the axial pressure on the plates of the friction clutch is reduced by extension of the spring 10 and finally the axial force on the clutch vanishes. The round pin 11 easily slips out of the recess 9 since there is no torque-transmitting connection between the dog clutch half 6 and the rotary part 8. The drive of the scythe rotors which have struck an obstacle is therefore automatically interrupted during the swinging movement so that there can be no damage to the rotors.

In order to bring the beam 2 back from the folded position shown in broken lines in FIG. 4 into the extended position shown in full lines, the driver of the tractor reverses so that the beam 2 swings back about the hinge 3 and comes into alignment with the carrier 1. The free end of the dog 12 slides along the ramp face 15 of the projection 14 and then finally snaps into engagement with the holding or retaining face 16 of the projection 14 so that the beam 2 is again locked in its working position. During the final stages of this swinging movement the round pin 11 comes into engagement with the spring 10 so that the clutch 7 is pressed against the rotary part 8 and transmits torque to the dog clutch half 6. The latter rotates in relation to the pin 11 until the pin is aligned with the recess and can slip into it. When this movement is completed, the drive connection between the shafts 4 and 5 is restored. The pin 11 can transmit torque with a slight misalignment of the shafts 4 and 5 when the dog 12 has not yet come into engagement with the face 16.

During the whole of the coupling manoeuvre the tractor driver does not need to dismount and it is also not necessary to disconnect the power take-off shaft. Work can immediately be resumed. This simplicity in operation leads to a great saving in time and effort.

Various modifications can be made in the construction shown.

Thus the implement need not be a rotary scythe mower but can be a hay turner or tedder with hay engaging parts rotating about upright axes and mounted on the beam 2.

We claim:

1. An agricultural field implement comprising a beam which is arranged to extend one side of the line of travel of a propelling means; a carrier adjacent to the line of travel; a hinge connecting the carrier with that end of the beam which is adjacent to the line of travel, the hinge allowing pivoting of the beam into a folded position from the extended position; tool means carried by, and arranged to be moved in relation to, the beam; a first shaft extending along the beam for powering the tool means, a second shaft which is journalled in the carrier and is generally coaxial with the first shaft; a dog clutch half fixed on one of the shafts and a dog clutch half journalled on the other shaft, the two clutch halves being arranged to be brought out of engagement by movement of the beam into the folded position and to be brought into torque-transmitting engagement on return pivoting movement of the beam; and a friction clutch connecting the journalled dog clutch half with the shaft on which it is mounted for torque-transmission between this clutch half and this shaft, the friction clutch being arranged to be brought into the torque-transmitting condition by an axial thrust produced by movement of the beam into the extended position.

2. An implement in accordance with claim 1, comprising a spring for exerting pressure on the friction clutch, the spring being arranged to be moved axially by the fixed dog clutch half.

3. An implement in accordance with claim 1, comprising a compression spring mounted coaxially on the journalled dog clutch half so that one end of the spring abuts against a shoulder on this dog clutch half while the other end is arranged to engage the other dog clutch half and, in the folded condition of the beam, to overlap a recess in the journalled dog clutch half.

4. An implement in accordance with claim 1, in which the fixed dog clutch half comprises a diametrical pin arranged to fit into a recess in the journalled dog clutch half.

5. An implement in accordance with claim 1, in which the hinge permits folding of the beam in a backward direction in relation to the line of travel of the propelling means and the implement further comprises an overload catch holding the beam in the extended position.

6. An implement in accordance with claim 5, comprising, as the catch, a spring-loaded dog and a projection with a ramp face arranged to be engaged by the dog.

7. An implement in accordance with claim 6, comprising means for adjusting the spring loading on the dog and thus the force required to push the beam out of the extended position.

References Cited

UNITED STATES PATENTS

| | | | |
|---|---|---|---|
| 2,504,018 | 4/1950 | Gibson et al. | 192—48.1 |
| 2,506,920 | 5/1950 | Ginn et al. | 192—70.27 |
| 2,714,436 | 8/1955 | Heisler | 192—48.6 |
| 3,110,146 | 11/1963 | Latshaw | 56—25 |
| 3,157,258 | 11/1964 | Cronholm | 192—48.5 |
| 3,389,540 | 6/1968 | Zweegers | 56—25.4 |

FOREIGN PATENTS 1,352,607  1/1964  France.

RUSSELL R. KINSEY, Primary Examiner

U.S. Cl. X.R.

56—6; 172—103; 192—34, 48.5, 48.6